July 17, 1962 F. BAYER 3,044,707
THERMOSTATIC MIXING VALVE
Filed Dec. 28, 1960
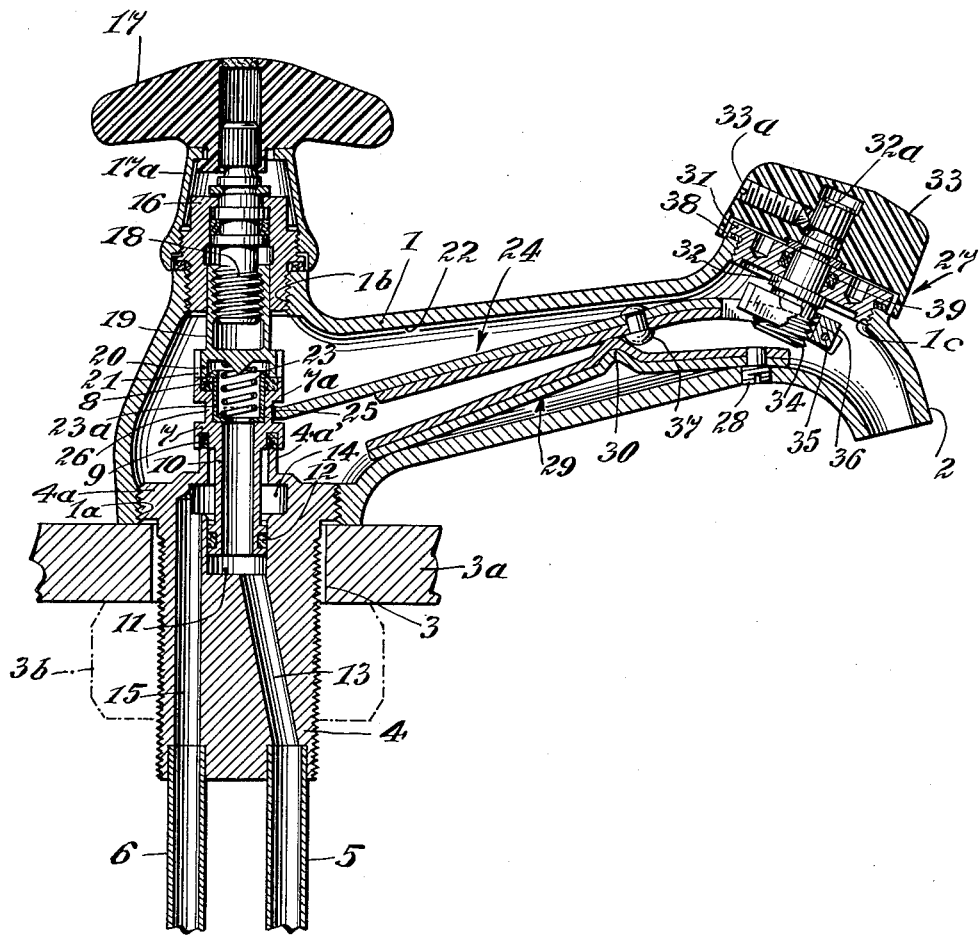
INVENTOR
Friedrich Bayer
BY
Michael S. Striker
his ATTORNEY 8,044,707
THERMOSTATIC MIXING VALVE
Friedrich Bayer, Deilinghofen, Kreis Iserlohn, Germany, assignor to Friedrich Grohe Armaturenfabrik, Hemer, Westphalia, Germany
Filed Dec. 28, 1960, Ser. No. 78,994
11 Claims. (Cl. 236—12)

The present invention relates to valves in general, and more particularly to a thermostatic valve which is utilized for proportionally mixing a cooler and a warmer fluid so that the resulting fluid mixture is maintained at a constant or nearly constant temperature.

An important object of the invention is to provide a very simple and highly reliable mixing valve which is particularly suited for proportional mixing of hot and cold water, which is independent of inevitable fluctuations in the pressure of the cold- and/or hot-water system, and which remains effective even if the rate of flow of the hot and/or cold water varies within a very wide range.

Another object of the invention is to provide a thermostatic mixing valve of the just outlined characteristics which is readily adjustable so as to determine in advance the temperature of the resulting fluid mixture, which occupies little space so as to be conveniently receivable in the housing of a conventional water tap or the like, which may be utilized in connection with nearly all types of fluids, and which may be conveniently and rapidly assembled or taken apart for inspection, repair or replacement of its component parts.

A further object of my invention is to provide a mixing valve, particularly for proportional mixing of hot and cold water, whose sensitivity may be increased and adjusted within a very wide range, and which is capable of immediately responding to changes in the rate of flow and/or pressure of the warmer or cooler fluid.

An additional object of the invention is to provide a mixing valve which is particularly suited for controlling the flow of water into sinks, bathtubs or like receptacles, which can be utilized for controlling the flow of water into the nozzle of a shower, and which can be readily substituted for mixing valves of presently known design.

With the above object in view, the invention resides in the provision of a mixing valve which comprises essentially a housing defining a mixing chamber wherein the streams of cooler and warmer fluid are intermixed before being discharged from the housing, two valve members supported in the housing in such a way that at least one thereof is movable toward and away from the other valve member, an intermediate member which is disposed between the two valve members and which defines with each valve member an outlet for respectively introducing cooler and warmer fluid into the mixing chamber, and two biasing means which respectively urge the intermediate member in two opposing directions and thereby tend to respectively reduce the outlets for cooler and warmer fluid. At least one of the two biasing means comprises at least one thermostat which extends into the mixing chamber so that its bias may be varied automatically in response to changes in the temperature of fluid mixture in the chamber. The arrangement is such that, once the movable valve member is shifted away from the other valve member, the intermediate member is caused by the two biasing means to assume a predetermined position which insures that the outlets for cooler and warmer fluid discharge the two fluids at a given ratio to thereby maintain the temperature of the fluid mixture in the chamber at a constant value.

Certain other features of the invention reside in the provision of novel adjusting means for the thermostat or thermostats enabling a person to determine in advance the temperature of the fluid mixture in the mixing chamber, in the provision of an auxiliary thermostat which assists one of the biasing means for more rapidly adjusting the two outlets, in the provision of specially configurated valve members, and in the provision of a specially configurated and mounted intermediate member.

The novel features which are considered as characteristic for the invention are set forth in particular in the appended claims. The invention itself, however, both as to its construction and its method of operation, together with additional objects and advantages thereof, will be best understood from the following detailed description of a specific embodiment when read in connection with the accompanying drawing the single illustration of which is a central section through the housing of a water tap which embodies the mixing valve of my invention.

Referring now in greater detail to the drawing, there is shown a water tap, such as may be utilized for introducing water into a bath tub, into a sink, or into any other form of receptacle utilized in a home, in a hairdresser shop, in a doctor's office or in any other institution where a constant supply of water at a predetermined temperature is required.

The tap comprises a housing 1 of conventional design having at one end a discharge nozzle 2 which communicates with an internal mixing chamber 22. The intake end of the housing 1 is sealed by a first valve member in the form of an externally threaded boss 4 whose collar 4a is screwed into the internally threaded intake opening 1a of the housing 1 and whose main body portion extends through an aperture 3 provided in a wall 3a, the latter forming part of a sink or the like. The valve member 4 is held in the position of FIG. 1 by a nut 3b which is shown in phantom lines at the underside of the wall 3a.

The main body portion of the valve member 4 is provided with bores accommodating the ends of two water supply pipes 5, 6. It is assumed that the pipe 5 is connected to a source of cooler water and that the pipe 6 is connected to a source of warmer water. The channel 13 in the valve member 4 conveys cooler water into the bottom zone of a coaxial compartment 11 which opens into the mixing chamber 22 and which communicates with an annular space 14, the latter being spaced from the discharge end of the channel 13. This annular space 14 communicates with a second channel 15 which delivers warmer water from the supply pipe 6 into the compartment 11.

The collar 4a of the valve member 4 is formed with an upwardly projecting coaxial extension 4a' whose end face is in abutment with an annular packing 9 provided in a hollow intermediate member 7. This intermediate member has a downwardly extending tubular portion or sleeve 10 which projects coaxially into the compartment 11 and which is spaced from the extension 4a' so as to permit warmer water to rise all the way to the packing 9. The open lower end of the sleeve 10 carries an annular packing 12, e.g. a rubber ring of circular cross-section, which has a tight sliding fit with the wall of the compartment 11 in the valve member 4 so that cooler water filling the lowermost portion of the compartment 11 cannot flow into the upper portion of this compartment to mix with warmer water in the annular space 14. The cooler water delivered by the supply pipe 5 is free to rise through the bore of the sleeve 10 and all the way to a third annular packing 8 which is recessed in the larger-diameter upper end portion 7a of the intermediate member 7. The packing 8 is retained in its position by the annular flange of a cupped member 23a which is press fitted into the intermediate member 7 and which is formed with an apertured bottom wall so as to permit the flow of cooler water to the packing 8. The wall of the upper end portion 7a is formed with one or more preferably axially parallel slots 21 which permit the discharge of cooler water into the mixing chamber 22 upon withdrawal of a second valve member 19 whose hollow upper end portion is provided with internal threads meshing with external threads on the lower end of a moving means here shown as a rotary spindle 18. This spindle is rotatably received in a bearing member or plug 16 which is screwed into a tapped bore 1b of the housing 1. It will be noted that the axis of the spindle 18 coincides with the axis of the intermediate member 7 and with the axes of the valve members 4, 19. The upper end of the spindle 18 projects from the plug 16 and is non-rotatably connected with a handgrip member 17 so that, when the handgrip member is rotated, the spindle 18 rotates in the plug 16 and lifts the second valve member 19 whereby the latter's cupped lower end 20 moves away from sealing engagement with the packing 8 to permit cooler water to flow into the mixing chamber 22. It will be readily understood that the valve member 19 is non-rotatably guided in the plug 16 to make sure that angular movements of the axially fixed spindle 18 will result in axial movements of the cupped lower end 20. The cupped member 23a receives a biasing means in the form of a helical expansion spring 23 which permanently urges the intermediate member 7 in a direction away from the valve member 19 by acting against the underside of a suitably configurated bottom wall in the cupped lower end 20. This insures that the intermediate member 7 is not free to follow axial movements of the valve member 19 when the latter is moved in upward direction away from the valve member 4 so that cooler water may flow from the interior of the upper end portion 7a and through the outlet defined by the slots 21 into the mixing chamber. In addition, the spring 23 tends to maintain the packing 9 in abutment with the extension 4a' to thereby prevent the discharge of warmer water from the annular space 14 even if the valve member 19 is lifted from its end position which is shown in the drawing, i.e. even if the member 19 is moved in a direction away from the valve member 4.

The intermediate member 7 is provided with a peripheral recess 26, preferably assuming the form of an annular groove, which accommodates with some play the bifurcated end 25 of a second biasing means in the form of a curved-strip bimetallic thermostat 24. The latter is mounted in the mixing chamber 22 and serves as a means for urging the intermediate member 7 upwardly and against the bias of the spring 23 so as to move the packing 9 away from the extension 4a' and to thereby permit the flow of warmer water into the mixing chamber. The connection of the thermostat 24 with an adjusting arrangement 27 will be described in greater detail hereinafter. This thermostat acts substantially as a flat spring and urges the intermediate member 7 in a direction counter to the bias of the expansion spring 23. Depending on the extent to which the bias of the thermostat 24 counteracts the bias of the spring 23, the intermediate member 7 will change its position between the valve members 4, 19 and will thereby vary the proportion of cooler water to warmer water respectively flowing into the mixing chamber through the outlet defined by the intermediate member with the valve member 19 and through the concentric outlet defined by the intermediate member with the valve member 4. It will be noted that the length of slotted upper end portion 7a of the intermediate member 7 is sufficient to properly guide the valve member 19 in the latter's movements toward and away from the valve member 4.

The improved mixing valve operates as follows:

In the position as shown in the drawing, the valve is fully closed because the valve member 19 is moved toward the valve member 4 so that the packing 9 bears against the upper end face of the extension 4a' to prevent the escape of warmer water from the annular space 14, and because the cupped lower end 20 of the valve member 19 bears against the packing 8 to prevent the flow of cooler water from the interior of the intermediate member 7.

If the valve member 19 is lifted by the spindle 18, i.e. if the handgrip member 17 is rotated in a direction to move the valve member 19 upwardly and to move the lower end 20 of this valve member away from the packing 8, the biasing means 23, 24 cause the intermediate member 7 to assume a given position between the valve members 4, 19 in which the intermediate member permits predetermined quantities of warmer and cooler water to flow into the mixing chamber 22 where the two water streams are intermixed so that the effluent flowing through the nozzle 2 is maintained at a constant temperature. It can be said that the proportion of warmer water to cooler water permitted to flow into the chamber 22 is determined by the ratio of resiliency of the thermostat 24 to the resiliency of the spring 23. Assuming that this ratio is 2:1 and further assuming that the spindle 18 has caused the valve member 19 to move through a distance of 6 mm., then the distance between the packing 8 and the cupped end portion 20 equals 2 mm. and the distance between the packing 9 and the extension 4a' equals 4 mm. In other words, twice as much warmer water than cooler water is admitted into the chamber 22 if the cross-sectional area of the outlet for cooler water between the members 7, 19 equals the cross-sectional area of the outlet for warmer water between the members 4, 7 when the spacing between the parts 4a', 9 and 8, 20 is the same.

As the two streams of water continue to flow into the mixing chamber 22, the thermostat 24 rapidly assumes a predetermined curvature and then retains such curvature unless the pressure or temperature of the one or the other inflowing water stream changes. For example, if the pressure of cooler water decreases so that the proportion of cooler water to warmer water in the mixing chamber is reduced with attendant drop in the temperature of the mixture, the thermostat 24 increases its curvature and permits the complementary spring 23 to reduce the outlet for warmer water while the area of the outlet for cooler water increases accordingly. The curvature of the thermostat 24 remains unchanged as soon as the original temperature of the mixture in the chamber 22 is restored. Inversely, when the ratio of cooler water to warmer water in the mixing chamber 22 increases, i.e. when the temperature of the mixture drops, the curvature of the thermostat 24 is reduced so that the latter counteracts with a greater force the bias of the spring 23 to lift the intermediate member 7 and to thereby increase the flow of warmer water with attendant reduction in the inflow of cooler water. The thermic equalizing properties of the thermostat 24 are not effected by the fact that the tap may be fully or only partially open. It can be said that the action of the mixing valve is fully automatic since the thermostat will react to any changes in the pressure, temperature and/or volume of cooler or warmer fluid so as to maintain the fluid mixture flowing through the nozzle 2 at a constant temperature. For example, if the pressure of cooler water is reduced from say 8 to 6 atmospheres absolute pressure, the thermostat 24 will form a more pronounced curve because the ratio of warmer water to cooler water in the mixing chamber increases with the result that the intermediate member 7 is moved toward the valve member 4 to thereby move the packing 9 closer to the extension 4a' and to reduce the flow of warmer water into the mixing chamber. The width of the annular groove 26 may be selected in such a way that very small fluctuations in the temperature of the fluid mixture in the chamber 22 need not immediately affect the position of the intermediate member 7.

In order to insure that the changes in temperature of the fluid mixture formed in the chamber 22 cannot exceed a predetermined range of say 0–2° C., the sensitivity of the bimetallic thermostat 24 may be increased by the provision of a second or auxiliary thermostat in the form of a bimetallic strip 29 which is fastened to the housing 1 by means of a screw 28 or the like. This second thermostat is also in direct contact with the water mixture in the chamber 22 and is formed with a projection or cam 30 which is in abutment with a motion transmitting element in the form of a headed pin 37 secured to a median portion of the thermostat 24. The cam 30 may be formed by providing the thermostat 29 with a pronounced dent or hump as is clearly shown in the drawing. The action of the second thermostat 29 is the reverse of the action of the first thermostat 24, i.e. the second thermostat will increase its curvature in response to a cooling of the fluid mixture in the chamber 22 and will then bear against the motion transmitting element 37 in order to urge the bifurcated end 25 of the thermostat 24 in upward direction with resultant rapid increase in the supply of warmer water. The auxiliary thermostat 29, working by leverage transmission, increases considerably the upward deflection of the thermostat 24, for example, to fourfold the normal deflection, so as to more rapidly compensate for any changes in the ratio of warmer water to cooler water flowing into the mixing chamber 22 when the spindle 18 moves the valve member 19 away from the valve member 4.

The adjusting arrangement 27 is utilized for setting in advance the temperature of the mixture in the chamber 22, i.e. for determining in advance the temperature of the effluent which is discharged through the nozzle 2. This adjusting arrangement comprises a carrier in the form of an externally threaded plug 31 which is screwed into a tapped bore 1c of the housing 1 and which serves as a bearing for a manually turnable rotary shaft 32 which latter is free to rotate but is held against axial displacements with respect to the plug 31. The fluted end 32a of the shaft 32 projects from the plug 31 and is non-rotatably connected with a handle or knob 33, e.g. by means of a radial screw 33a. The larger-diameter outer end portion of the plug 31 is drawn tight against an annular packing 38 to prevent the escape of water through the bore 1c. A similar packing 39 is provided in the bore of the plug 31 to form a seal about the periphery of the shaft 32. The inner end of the shaft 32 is externally threaded, as at 34, and meshes with a nut 36 which is received in a forked rear end portion 35 of the thermostat 24 which is sufficiently distant from the intermediate member to permit a flexing of this thermostat. This forked end portion 35 is fixed to the nut 36 so that any angular displacements of the shaft 32 will bring about different deformations of the thermostat 24 in order to increase or to reduce the ratio of warmer to cooler water. For example, if the knob 33 is turned in a direction to lift the nut 36 toward the plug 31, the other bifurcated end 25 of the thermostat 24 will bear with a greater force against the upper end wall of the groove 26 and will increase the flow of warmer water into the chamber 22 as soon as the handgrip member 17 lifts the valve member 19 along the spindle 18. Of course, the bifurcated end portion 35 of the thermostat 24 holds the nut 36 against rotation with the shaft 32.

It will be readily understood that the entire mixing valve may be readily taken apart for inspection, repair and/or cleaning of its component parts. For example, in order to remove the thermostat 24, the operator removes the radial screw 33a to permit separation of the knob 33 from the shaft 32, whereupon the plug 31 may be unscrewed from the bore 1c together with its shaft 32. In the next step, the operator merely withdraws the nut 36 through the bore 1c together with the entire bimetallic strip 24. When the bore 1c is exposed, the auxiliary thermostat 29 may be readily withdrawn upon removal of the retaining screw 28. The manner in which the valve member 4 and the plug 16 may be separated from the housing 1 is self-evident.

The periphery of the knob 33 may be provided with a scale calibrated in degrees and cooperating with a marker on the adjacent portion of the housing 1 so as to facilitate the work of a person in setting the mixing valve to a position in which the fluid discharged from the chamber 22 attains a predetermined temperature. A similar scale can be provided on the annular shell 17a which rotates with the handgrip member 17 to indicate the combined quantity of cooler and warmer fluid flowing into the chamber 22 per unit of time.

It will be readily understood that the bimetallic strip 24 represents but one form of thermostatic biasing means for maintaining the temperature of fluid mixture in the chamber 22 at a constant value.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letter Patent is:

1. A valve for proportionally mixing a warmer and a cooler fluid so that the resulting fluid mixture is maintained at a substantially constant temperature, said valve comprising, in combination, housing means defining a mixing chamber; a first and a second valve member in said housing means; a tubular intermediate member disposed between said valve members, said intermediate member located in the path of and separating the cooler and warmer fluids so that one of the fluids may flow through and that the other fluid may flow about said intermediate member, one of said valve members and said intermediate member defining between themselves a first outlet for introducing the one fluid into said chamber, and the other valve member and said intermediate member defining between themselves a second outlet for introducing the other fluid into said chamber, first biasing means for permanently urging said intermediate member away from said one valve member and for thereby exposing said first outlet; and second biasing means for permanently urging said intermediate member away from the other valve member and for thereby exposing said second outlet, at least one of said biasing means comprising thermostat means extending into said chamber so that its bias is varied in response to changes in temperature of the fluid mixture in said chamber whereby the extent to which said outlets are exposed is adjusted by movement of said intermediate member with respect to said valve members.

2. A valve for proportionally mixing a warmer and a co-directional cooler fluid so that the resulting fluid mixture is maintained at a substantially constant temperature, said valve comprising, in combination, housing means defining a mixing chamber; a first and a coaxial second valve member in said housing means; a tubular intermediate member coaxially disposed between said valve members, said intermediate member located in the path of and separating the cooler and warmer fluids so that one of the fluids may flow through and that the other fluid may flow about said intermediate member, one of said valve members and said intermediate member defining between themselves a first outlet for introducing the one fluid into said chamber, and the other valve member and said intermediate member defining between themselves a second outlet coaxial with said first outlet for introducing the other fluid into said chamber; first biasing means for permanently urging said intermediate member away from said one valve member and for thereby exposing said first outlet and second biasing means for permanently urging said intermediate member away from the other valve member and for thereby exposing said second outlet, at least one of said biasing means comprising at least one bimetallic thermostat extending into said chamber so that its bias is varied in response to changes in temperature of the fluid mixture in said chamber whereby the extent to which said outlets are exposed is adjusted by movement of said intermediate member with respect to said valve members.

3. A valve for proportionally mixing a warmer and a cooler fluid so that the resulting fluid mixture is maintained at a substantially constant temperature, said valve comprising, in combination, housing means defining a mixing chamber; a first and a second valve member in said housing means, said first valve member having a threaded portion; means for moving said first valve member toward and away from the second valve member, said moving means comprising spindle means rotatably received in said housing means and meshing with the threaded portion of said first valve member; an intermediate member disposed between said valve members, one of said valve members and said intermediate member defining between themselves a first outlet for introducing one of the fluids into said chamber, and the other valve member and said intermediate member defining between themselves a second outlet for introducing the other fluid into said chamber, said outlets sealable when said first valve member is moved toward said second valve member and said outlets adapted to be exposed when said first valve member is moved away from said second valve member; first biasing means for permanently urging said intermediate member away from said one valve member and for thereby exposing said first outlet when said first valve member is moved away from said second valve member; and second biasing means for permanently urging said intermediate member away from the other valve member and for thereby exposing said second outlet when said first valve member is moved away from said second valve member, at least one of said biasing means comprising thermostat means extending into said chamber so that its bias is varied in response to changes in temperature of the fluid mixture in said chamber whereby the extent to which said outlets are exposed is adjusted by movement of said intermediate member with respect to said valve members.

4. A valve for proportionally mixing a warmer and a cooler fluid so that the resulting fluid mixture is maintained at a substantially constant temperature, said valve comprising, in combination, housing means defining a mixing chamber; a first valve member and a coaxial hollow second valve member disposed in said housing means; a hollow intermediate member coaxially disposed between said valve members, said intermediate member having a sleeve sealingly received in said second valve member and said intermediate member defining with said second valve member a first outlet for introducing one of the fluids into said chamber, said outlet sealable by said intermediate member when said first valve member is moved and entrains said intermediate member toward said second valve member, said first valve member and said intermediate member defining between themselves a second outlet for introducing the other fluid into said chamber and said first valve member having an end engageable with said intermediate member to seal said second outlet when said first valve member is moved toward said second valve member; first biasing means for permanently urging said intermediate member away from said one valve member and for thereby exposing said first outlet when said first valve member is moved away from said second valve member; and second biasing means for permanently urging said intermediate member away from the other valve member and for thereby exposing said second outlet when said first valve member is moved away from said second valve member, at least one of said biasing means comprising thermostat means extending into said chamber so that its bias is varied in response to changes in temperature of the fluid mixture in said chamber whereby the extent to which said outlets are exposed is adjusted by movement of said intermediate member with respect to said valve members.

5. A valve for proportionally mixing a warmer and a cooler fluid so that the resulting fluid mixture is maintained at a substantially constant temperature, said valve comprising, in combination, housing means defining a mixing chamber; a first valve member and a coaxial hollow second valve member disposed in said housing means; a hollow intermediate member coaxially disposed between said valve members, said intermediate member having a sleeve received in and comprising a ring of round rubber sealingly engaging with said second valve member, said intermediate member defining with said second valve member a first outlet for introducing one of the fluids into said chamber, said outlet sealable by said intermediate member when said first valve member is moved and entrains said intermediate member toward said second valve member, said first valve member and said intermediate member defining between themselves a second outlet for introducing the other fluid into said chamber and said first valve member having an end engageable with said intermediate member to seal said second outlet when said first valve member is moved toward said second valve member; first biasing means for permanently urging said intermediate member away from said one valve member and for thereby exposing said first outlet when said first valve member is moved away from said second valve member; and second biasing means for permanently urging said intermediate member away from the other valve member and for thereby exposing said second outlet when said first valve member is moved away from said second valve member, at least one of said biasing means comprising thermostat means extending into said chamber so that its bias is varied in response to changes in temperature of the fluid mixture in said chamber whereby the extent to which said outlets are exposed is adjusted by movement of said intermediate member with respect to said valve members.

6. A valve for proportionally mixing a warmer and a cooler fluid so that the resulting fluid mixture is maintained at a substantially constant temperature, said valve comprising, in combination, housing means defining a mixing chamber; a first and a second valve member in said housing means; means for moving said first valve member toward and away from the second valve member; an intermediate member disposed between said valve members, one of said valve members and said intermediate member defining between themselves a first outlet for introducing one of the fluids into said chamber, and the other valve member and said intermediate member defining between themselves a second outlet for introducing the other fluid into said chamber, said outlet sealable when said first valve member is moved toward said second valve member and said outlets adapted to be exposed when said first valve member is moved away from said second valve member; first biasing means for permanently urging said intermediate member away from said one valve member and for thereby exposing said first outlet when said first valve member is moved away from said second valve member; and second biasing means for permanently urging said intermediate member away from the other valve member and for thereby exposing said second outlet when said first valve member is moved away from said second valve member, one of said biasing means comprising a curved-strip bimetallic thermostat having a forked end portion received in a recess formed in said intermediate member, said thermostat extending into said chamber so that its curvature and its bias upon said intermediate member are varied in response to changes in temperature of the fluid mixture in said chamber whereby the extent to which said outlets are exposed is adjusted by movement of said intermediate member with respect to said valve members under the bias of said first biasing means and said thermostat.

7. A valve for proportionally mixing a warmer and a cooler fluid so that the resulting fluid mixture is maintained at a substantially constant temperature, said valve comprising, in combination, housing means defining a mixing chamber; a first and a second valve member in said housing means; means for moving said first valve member toward and away from the second valve member; an intermediate member disposed between said valve members, one of said valve members and said intermediate member defining between themselves a first outlet for introducing one of the fluids into said chamber, and the other valve member and said intermediate member defining between themselves a second outlet for introducing the other fluid into said chamber, said outlets sealable when said first valve member is moved toward said second valve member and said outlets adapted to be exposed when said first valve member is moved away from said second valve member; first biasing means for permanently urging said intermediate member away from said one valve member and for thereby exposing said first outlet when said first valve member is moved away from said second valve member; second biasing means for permanently urging said intermediate member away from the other valve member and for thereby exposing said second outlet when said first valve member is moved away from said second valve member, one of said biasing means comprising a curved-strip bimetallic thermostat having an end portion engaging with said intermediate member, said thermostat extending into said chamber so that its curvature and its bias are varied in response to changes in temperature of the fluid mixture in said chamber whereby the extent to which said outlets are exposed is adjusted by movement of said intermediate member with respect to said valve members under the bias of said first biasing means and said thermostat; and an arrangement for adjusting the bias of said thermostat.

8. A valve for proportionally mixing a warmer and a cooler fluid so that the resulting fluid mixture is maintained at a substantially constant temperature, said valve comprising, in combination, housing means defining a mixing chamber; a first and a second valve member in said housing means; means for moving said first valve member toward and away from the second valve member; an intermediate member disposed between said valve members, one of said valve members and said intermediate member defining between themselves a first outlet for introducing one of the fluids into said chamber, and the other valve member and said intermediate member defining between themselves a second outlet for introducing the other fluid into said chamber, said outlets sealable when said first valve member is moved toward said second valve member and said outlets adapted to be exposed when said first valve member is moved away from said second valve member; first biasing means for permanently urging said intermediate member away from said one valve member and for thereby exposing said first outlet when said first valve member is moved away from said second valve member; second biasing means for permanently urging said intermediate member away from the other valve member and for thereby exposing said second outlet when said first valve member is moved away from said second valve member, one of said biasing means comprising a curved-strip bimetallic thermostat having a first end portion engaging with said intermediate member and a second end portion, said thermostat extending into said chamber so that its curvature and its bias are varied in response to changes in temperature of the fluid mixture in said chamber whereby the extent to which said outlets are exposed is adjusted by movement of said intermediate member with respect to said valve members under the bias of said first biasing means and said thermostat; and an arrangement for adjusting the bias of said thermostat, said arrangement comprising a nut fixed to the second end of said thermostat and threaded shaft means meshing with said nut, said spindle means rotatably received in said housing means and comprising handle means disposed externally of said housing means, and said spindle adapted to change the curvature of said thermostat by rotating with respect to said nut.

9. A valve for proportionally mixing a warmer and a cooler fluid so that the resulting fluid mixture is maintained at a substantially constant temperature, said valve comprising, in combination, housing means defining a mixing chamber; a first and a second valve member in said housing means; means for moving said first valve member toward and away from the second valve member; an intermediate member disposed between said valve members, one of said valve members and said intermediate member defining between themselves a first outlet for introducing one of the fluids into said chamber, and the other valve member and said intermediate member defining between themselves a second outlet for introducing the other fluid into said chamber, said outlets sealable when said first valve member is moved toward said second valve member and said outlets adapted to be exposed when said first valve member is moved away from said second valve member; first biasing means for permanently urging said intermediate member away from said one valve member and for thereby exposing said first outlet when said first valve member is moved away from said second valve member; and second biasing means for permanently urging said intermediate member away from the other valve member and for thereby exposing said second outlet when said first valve member is moved away from said second valve member, one of said biasing means comprising a first curved-strip bimetallic thermostat having an end engaging with said intermediate member and extending into said chamber so that its curvature and its bias are varied in response to changes in temperature of the fluid mixture in said chamber whereby the extent to which said outlets are exposed is adjusted by movement of said intermediate member with respect to said valve members, and a second bimetallic thermostat received in said chamber and engaging with said first thermostat for increasing the latter's bias upon said intermediate member in response to temperature changes in said mixing chamber.

10. A valve for proportionally mixing a warmer and a cooler fluid so that the resulting fluid mixture is maintained at a substantially constant temperature, said valve comprising, in combination, housing means defining a mixing chamber; a first and a second valve member in said housing means; means for moving said first valve member toward and away from the second valve member; an intermediate member disposed between said valve members, one of said valve members and said intermediate member defining between themselves a first outlet for introducing one of the fluids into said chamber, and the other valve member and said intermediate member defining between themselves a second outlet for introducing the other fluid into said chamber, said outlets sealable when said first valve member is moved toward said second valve member and said outlets adapted to be exposed when said first valve member is moved away from said second valve member; first biasing means for permanently urging said intermediate member away from said one valve member and for thereby exposing said first outlet when said first valve member is moved away from said second valve member; and second biasing means for permanently urging said intermediate member away from the other valve member and for thereby exposing said second outlet when said first valve member is moved away from said second valve member, one of said biasing means comprising a first curved-strip bimetallic thermostat having an end engaging with said intermediate member and extending into said chamber so that its curvature and its bias are varied in response to changes in temperature of the fluid mixture in said chamber whereby the extent to which said outlets are exposed is adjusted by movement of said intermediate member with respect to said valve members, and a second bimetallic thermostat received in said chamber and engaging with said first thermostat for increasing the latter's bias upon said intermediate member in response to temperature changes in said mixing chambers, said second thermostat comprising a projection and said first thermostat comprising a motion transmitting element engaging with said projection.

11. A valve for proportionally mixing a warmer and a cooler fluid so that the resulting fluid mixture is maintained at a substantially constant temperature, said valve comprising, in combination, housing means defining a mixing chamber; a first and a second valve member in said housing means; means for moving said first valve member toward and away from the second valve member; an intermediate member disposed between said valve members, one of said valve members and said intermediate member defining between themselves a first outlet for introducing one of the fluids into said chamber, and the other valve member and said intermediate member defining between themselves a second outlet for introducing the other fluid into said chamber, said outlets sealable when said first valve member is moved toward said second valve member and said outlets adapted to be exposed when said first valve member is moved away from said second valve member; first biasing means for permanently urging said intermediate member away from said one valve member and for thereby exposing said first outlet when said first valve member is moved away from said second valve member; and second biasing means for permanently urging said intermediate member away from the other valve member and for thereby exposing said second outlet when said first valve member is moved away from said second valve member, one of said biasing means comprising a first curved-strip bimetallic thermostat having an end engaging with said intermediate member and extending into said chamber so that its curvature and its bias are varied in response to changes in temperature of the fluid mixture in said chamber whereby the extent to which said outlets are exposed is adjusted by movement of said intermediate member with respect to said valve members, manually operated adjusting means for changing the bias of said thermostat, said adjusting means comprising a threaded shaft rotatably received in said housing means, and nut means meshing with said shaft and rigidly fixed to said thermostat at a point spaced from said intermediate member, and a second bimetallic thermostat received in said chamber and engaging with said first thermostat for increasing the latter's bias upon said intermediate member in response to temperature changes in said mixing chamber.

References Cited in the file of this patent
UNITED STATES PATENTS

| | | |
|---|---|---|
| 2,159,033 | Leonard | May 23, 1939 |
| 2,159,819 | Snediker | May 23, 1939 |
| 2,193,581 | Clokey | Mar. 12, 1940 |